April 21, 1964

F. K. HOLBROOK 3,129,738

CUTTER FOR CITRUS PEEL HALVES

Filed Feb. 21, 1961

FRANKLIN K. HOLBROOK
INVENTOR.

BY

ATTORNEYS.

April 21, 1964  F. K. HOLBROOK  3,129,738
CUTTER FOR CITRUS PEEL HALVES

Filed Feb. 21, 1961  2 Sheets-Sheet 2

FRANKLIN K. HOLBROOK
INVENTOR.

BY *Lyon & Lyon*

ATTORNEYS.

United States Patent Office 3,129,738
Patented Apr. 21, 1964

3,129,738
CUTTER FOR CITRUS PEEL HALVES
Franklin K. Holbrook, Whittier, Calif., assignor to Brown Citrus Machinery Corporation, Whittier, Calif., a corporation of California
Filed Feb. 21, 1961, Ser. No. 90,829
3 Claims. (Cl. 146—3)

This invention relates to citrus juice extracting devices and has particular reference to improvements in citrus juice extracting machines.

A primary object of the present invention is to provide a citrus juice extracting machine having novel means for cutting the juice-depleted peel halves into two or more segments.

Recent advances in the citrus processing industry include the development of new aparatus for the extraction of oil from the peel of juice-depleted citrus peel, such apparatus being designed to operate at maximum efficiency upon segments of peel smaller than halves, preferably quarters. A further object of this invention is therefore to provide novel means incorporated in a citrus juice extracting machine, for quartering, or substantially quartering the juice-depleted peel halves produced by the extracting machine.

A further object of the present invention is to provide a novel peel-quartering knife or saw and peel ejector assembly adapted to be easily installed in existing juice extracting machines.

Other objects and advantages of this invention it is believed will be readily apparent from the following detailed description of a prefered embodiment thereof when read in connection with the accompanying drawings.

Figure 1:
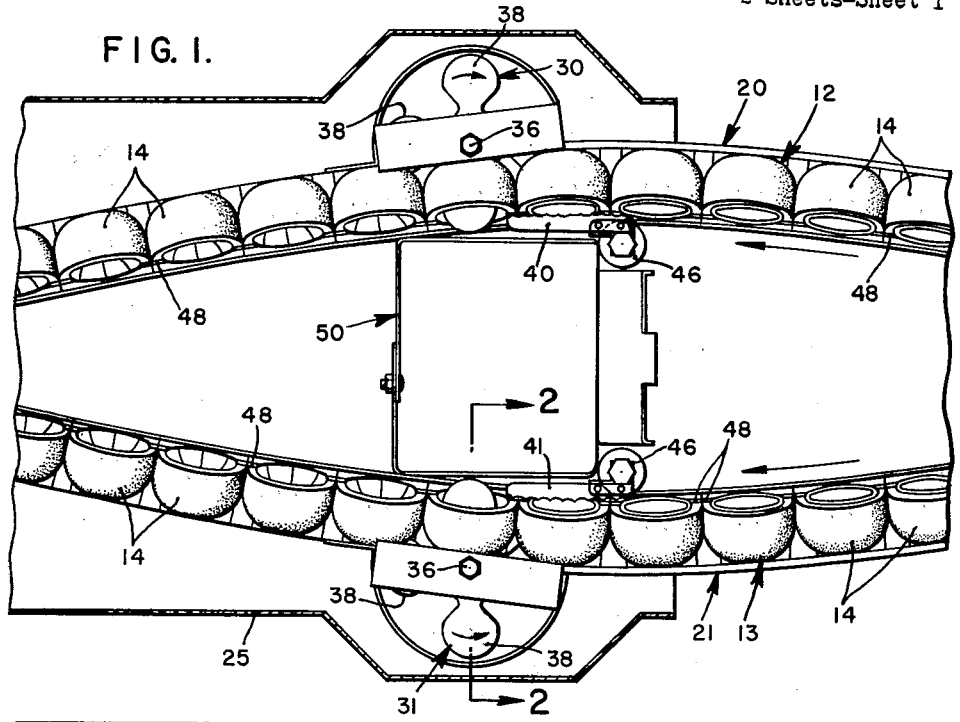
FIGURE 1 is a fragmentary plan view of a citrus juice extracting machine embodying the present invention.
Figure 2:
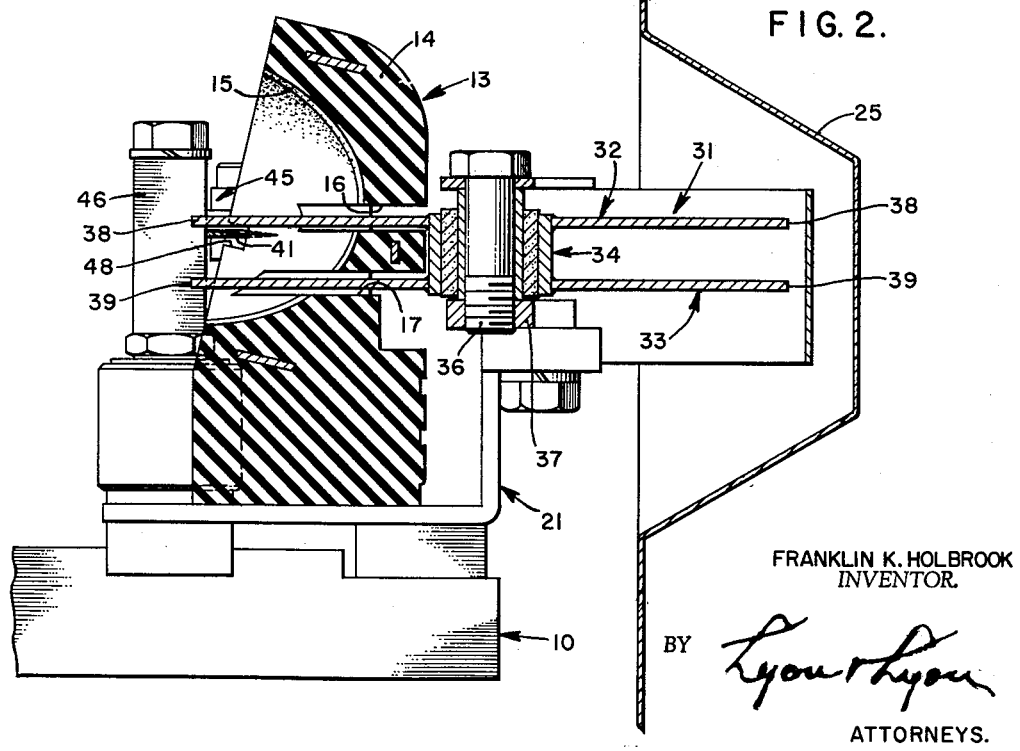
FIGURE 2 is a sectional elevation taken substantially on the line 2—2 of FIGURE 1.
Figure 3:
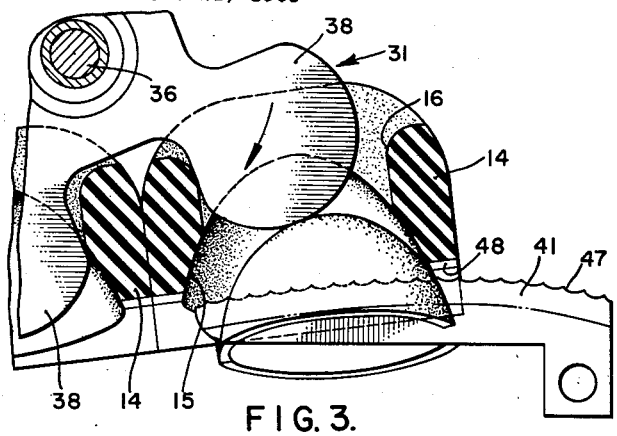
FIGURES 3, 4 and 5 are similar diagrammatic views in plan, illustrating sequential steps in the operation of the quartering means of the present invention.

Referring now to the drawings, the citrus juice extracing machine embodying the present invention is in general, with the exception of the improvements hereinafter described, substantially the same as that described in U.S. Patent No. 2,631,625 issued March 17, 1953, to Lloyd A. Wells, and comprises a frame 10 in which a pair of conveyor belts 12 and 13 are mounted. Each conveyor consists of a plurality of cups 14 pivotally connected together, each cup forming in substance a link of a completed chain-like conveyor. Each cup on the conveyor is complementary to a similar cup on the other conveyor and the two cups when brought together form a sphere for the purpose of holding or receiving generally spherical fruit such as oranges, grapefruit, lemons and the like. The cups are preferably formed of rubber or plastic and are provided with grooved inner surfaces 15 and with a pair of slots 16 and 17 extending through the cup-back sides.

The conveyors 12 and 13 converge at each end and diverge in the center, pivoted guides or tracks 20 and 21 being provided to define the paths of movement of the conveyors. The apparatus is provided at one end with means (not shown) for feeding whole fruit into the cups, and then cutting the fruit into halves, and with reamer means (not shown) at the other end for reaming the fruit halves to extract the juice therefrom. A sheet metal housing 25 encloses the operating parts of the apparatus.

In opeartion of the machine thus far described, which, as indicated above, is substantially the same as that disclosed in the above mentioned Wells patent, the upper runs of the conveyors 12 and 13 move in the direction of the arrows of FIGURE 1, each cup containing a juice-depleted fruit half which has just been reamed to remove its pulp and juice. Means are provided for ejecting the halves from the cups and as shown in the drawings, these means may include the pair of ejector wheels 30 and 31, one for each conveyor. Each wheel comprises a pair of plates 32 and 33 secured to a bushing assembly 34 freely rotatable on a shaft 36 suitable secured to a bracket 37 connected to the tracks 20 and 21. The plates are each provided with a plurality of curved paddle members 38 and 39 adapted to enter the respective slots 16 and 17 in the cups. The wheels 30 and 31 are caused to rotate by the movement of the conveyors 12 and 13, the paddles of each wheel being so shaped and spaced apart so that a pair of paddles 38 and 39 are always within the respective slots 16 and 17.

Means are provided for cutting the peel halves as they are ejected from the cups and as shown in the drawings these means may include a pair of knives 40 and 41, one mounted inwardly of and adjacent each of the conveyors 12 and 13. Each knife is bolted to a bracket member 45 which is secured to a post member 46 carried on the track 21. The knives are preferably provided with curved, saw-toothed cutting edges 47 extending into a slot 48 in the cup edges. The spacing of the knives with respect to the paddles of the ejector wheel is quite critical, the knives being positioned so that the free ends thereof lie just inside the arc of rotation of the paddles and just forwardly (with respect to the direction of conveyor travel) of the portion of that arc which lies closest to the longitudinal center line of the machine, the plane of each knife being parallel to and lying between the plane of the respective paddles 38 and 39.

A chute 50 is positioned between the conveyors opposite the ejector wheels for the reception of the peel segments as they are ejected from the cups.

Figure 6:
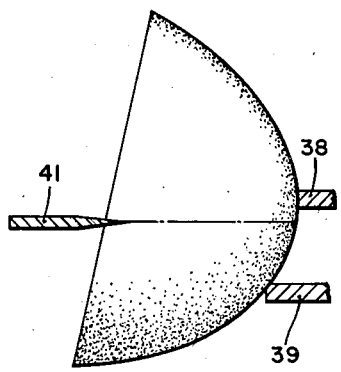
FIGURE 6 is a diagrammatic side view illustrating the manner in which the cut is made.
Figure 4:
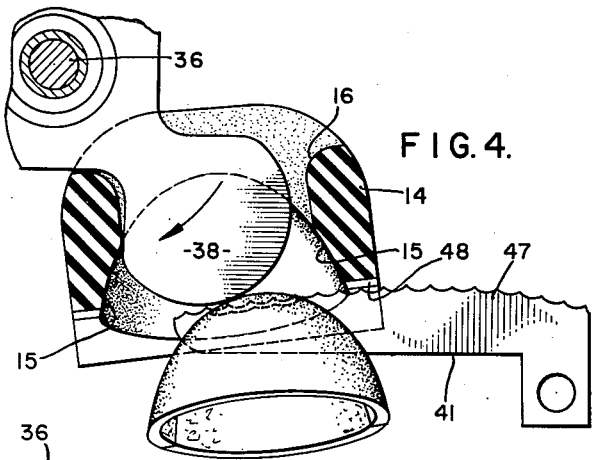
Figure 7:
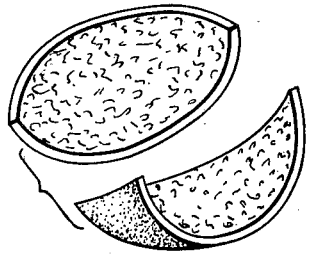
FIGURE 7 is a perspective view illustrating a citrus peel half quartered by the apparatus of the present invention.
Figure 5:
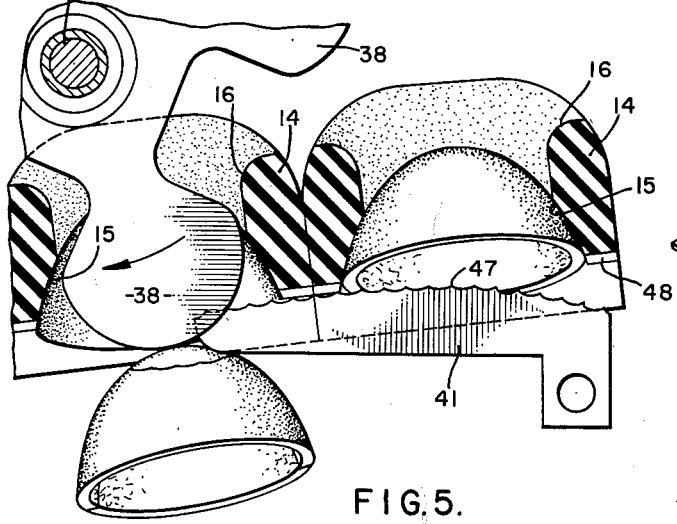
Figure 8:
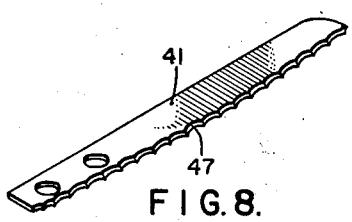
FIGURE 8 is a perspective view of the peel quartering knife.

In operation, the ejector wheels are driven by the cups as they pass the ejector, the paddles moving through the slots 16 and 17 to push the peel halves outwardly of the cups. This portion of the operation is best shown in the diagrammatic views of FIGURES 3 through 6. Thus, as the peel half is moved outwardly from the cup by the paddles, it contacts the stationary knife 41 and is bisected thereby as the continued outward thrust of the paddles causes the peel half to be wiped across the knife, until the peel half is completely cut into substantially two quarters. These are not true quarters, but only approximations thereof, due to the slight angular position of the peel half as it is being cut, as is shown in FIGURE 6. The peel quarters fall into and through the chute, from which they are collected for the subsequent oil removal operation.

Having fully described my invention, it is to be understood that I do not wish to be limited to the details set forth herein but my invention is of the full scope of the appended claims.

I claim:

1. In combination with citrus juice extracting machines of the type including a conveyor composed of a plurality of slotted cups and adapted to contain a fruit peel half, and an ejector wheel having paddles adapted to enter said cups to eject the peel halves therefrom: a stationary knife mounted adjacent the path of travel of said conveyor and positioned in overlapping relation with respect to the plane defined by the rotational arc of said paddles to cut the peel halves as they are ejected from the cups.

2. The combination of claim 1 wherein each cup is provided with a pair of parallel, spaced slots, wherein each wheel has a plurality of pairs of spaced, parallel paddles and wherein the plane of the knife is parallel to and lies between the plane of said pairs of paddles.

3. In a citrus juice extracting machine, a frame, a conveyor on said frame carrying a plurality of slotted cups, each cup adapted to contain a fruit peel half, means mounted on said frame and insertable through said slots to eject fruit peel halves contained in said cups, and a knife mounted on said frame and operably associated with said cups and said means to cut peel halves as they are ejected from the cups by said means.

References Cited in the file of this patent
UNITED STATES PATENTS

| | | |
|---|---|---|
| 2,631,625 | Wells | Mar. 17, 1953 |
| 2,739,345 | Kristmann et al. | Mar. 27, 1956 |